United States Patent [19]

Davenport et al.

[11] Patent Number: 5,278,731
[45] Date of Patent: Jan. 11, 1994

[54] FIBER OPTIC LIGHTING SYSTEM USING CONVENTIONAL HEADLAMP STRUCTURES

[75] Inventors: John M. Davenport, Lyndhurst; Richard L. Hansler, Pepper Pike, both of Ohio

[73] Assignee: General Electric Company, Schenectady, N.Y.

[21] Appl. No.: 943,351

[22] Filed: Sep. 10, 1992

[51] Int. Cl.⁵ .................................. F21V 8/00
[52] U.S. Cl. ............................ 362/32; 362/61; 362/298; 362/299
[58] Field of Search ........... 362/32, 61, 298, 299, 362/346

[56] References Cited

U.S. PATENT DOCUMENTS

| | | | |
|---|---|---|---|
| 3,360,640 | 12/1967 | Seitz et al. | 362/32 |
| 3,772,506 | 11/1973 | Junginger | 362/32 |
| 4,152,752 | 5/1979 | Niemi | 362/32 |
| 4,671,630 | 6/1987 | Takahashi | 362/32 |
| 4,740,870 | 4/1988 | Moore et al. | 362/32 |
| 4,811,171 | 3/1989 | Viola | 362/32 |
| 4,958,263 | 9/1990 | Davenport et al. | 362/32 |
| 4,974,094 | 11/1990 | Morito | 362/32 |

Primary Examiner—Richard R. Cole
Attorney, Agent, or Firm—George E. Hawranko; Stanley C. Corwin

[57] ABSTRACT

A lighting system particularly suited for an automotive application in which it is desired to utilize a central light source and couple the light output therefrom to a headlamp assembly having a number of conventional components includes introducing an output end of a light guide to the reflector assembly in place of an incandescent lamp, and disposing a mirror at the output end of the light guide to reflect light onto a conventional parabolic reflector. The mirror is preferably planar and serves to direct the light from the output end of the light guide to the parabolic reflector for collimation thereby and subsequent passage through a conventional lens member.

16 Claims, 4 Drawing Sheets

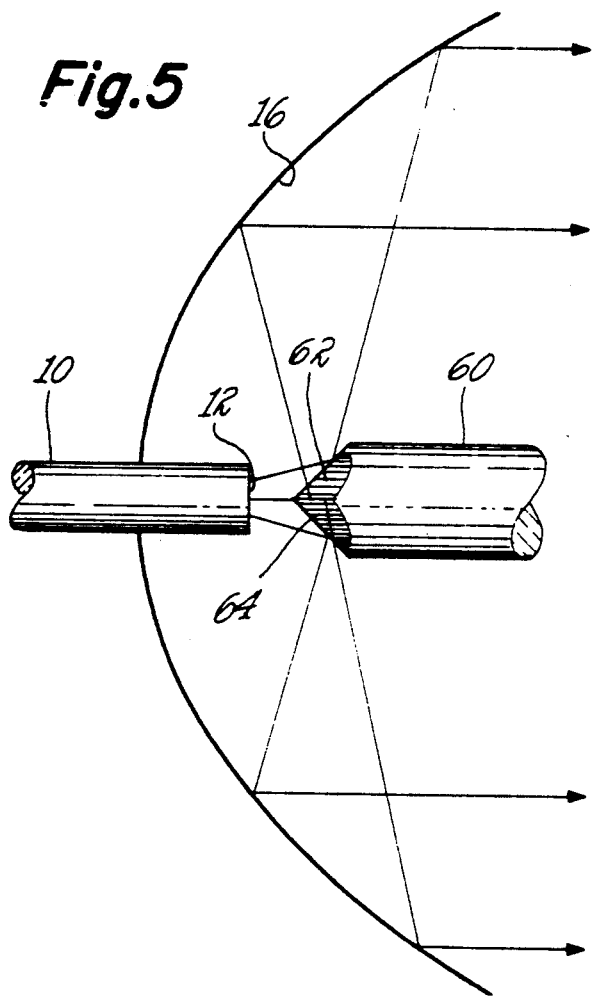
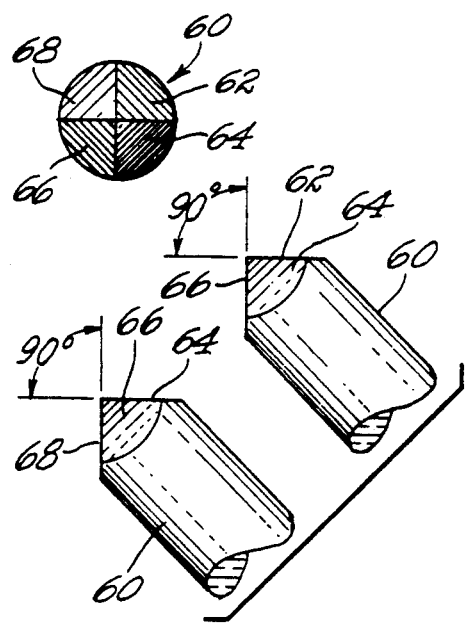
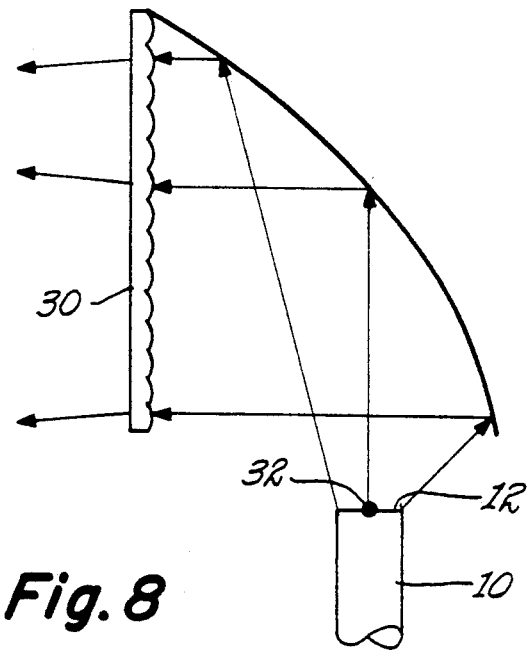

FIBER OPTIC LIGHTING SYSTEM USING CONVENTIONAL HEADLAMP STRUCTURES

This invention relates to a lighting system, particularly one employing a fiber optic conductor or light guide that conducts light from a light source to a remote location. More particularly, the lighting system finds application in a headlamp using a curvilinear reflecting surface, such as a parabolic mirror, in conjunction with a lens. Of course, it will be understood that the invention may be advantageously used in still other environments and applications without departing from the scope and intent of the subject invention.

Recent developments in automotive headlamp systems indicate a continued advancement toward eventual use of a high intensity light source that will provide sufficient light for multiple illumination needs in an automobile. The light source is preferably centrally located and the light distributed by means of a series of light guides or conductors to remote locations. For example, a set of light guides will convey light from the source to the headlamps, while another set will service the parking lights, turn signals, and perhaps another set will transmit light from the source for interior use. Reference may be made to commonly assigned U.S. Pat. No. 4,958,263 which discloses such a centralized lighting system so that further discussion herein is deemed unnecessary to a full and complete understanding of the present invention.

Although a number of benefits and advantages are offered by a centralized light source in combination with a series of light guides for the headlamps, there is presently continued reliance on commercially accepted and well known incandescent headlamp systems. Acceptance of and changeover to the centralized lighting system necessarily requires a number of design and tooling changes, all with an accompanying cost factor. On the other hand, a large economic expenditure has already been invested in existing systems. This prior expenditure in conjunction with the prospect of wholesale changes to completely implement the centralized lighting system are believed to be some factors impeding the acceptance of the new system.

Thus, an interim development is required to bridge the gap between traditional or conventional lighting systems and the incorporation of this more recently developed technology. It is believed that automotive manufacturers strongly desire an interim system that uses many of the design and dimensional parameters of known arrangements (e.g. incandescent headlamp structures) to avoid the expense associated with an entirely new lighting system. A more gradual implementation of the newer technology by combining it with existing design parameters and hardware, i.e., retro-fitting existing hardware, is highly desirable.

Additionally, automotive lighting systems, particularly headlamp structures, must continually meet the demand for smaller, more compact arrangements. Of course, the demand for more compact arrangements must simultaneously satisfy other performance criteria. For example, although there is an emphasis on the part of some headlamp manufacturers to use the advantages offered by projection lighting systems, those systems unfortunately encounter difficulty in meeting the space requirements requested by automotive manufacturers.

Accordingly, a principal object of the invention is to retrofit existing headlamp systems with portions of a centralized lighting system.

Another object of the invention is the use of only a portion of a parabolic reflecting surface to permit a smaller headlamp opening without loss of function.

SUMMARY OF THE INVENTION

The present invention contemplates a new and improved lighting system that serves as an interim bridge between existing headlamp technology and the expected continued development and adaptation to centralized lighting systems, while addressing retrofit and dimensional concerns, in a simple, economical manner.

According to one aspect of the invention, a conventional headlamp housing is modified by removing an incandescent lamp (light source) and introducing an output end of a light guide associated with a centralized lighting system. A mirror is located adjacent the output end of the light guide to reflect the light onto a curvilinear reflecting surface, such as a parabolic surface, which collimates the light before it passes through a conventional lens. Preferably, the mirror is a planar surface that preserves the directional nature of the light received from the light conductor.

According to another aspect of the invention, a compact headlamp structure is achieved by using a portion of a parabolic reflecting surface in conjunction with the output end of the light guide. The light guide can be disposed off-axis and advantageously employ the directional properties associated with light exiting the light guide.

BRIEF DESCRIPTION OF THE DRAWINGS

The invention may take physical form in certain parts and arrangements of parts, preferred embodiments of which will be described in detail in the specification and illustrated in the accompanying drawings which form a part hereof, and wherein:

FIG. 5 is a view partly in cross-section of still another preferred arrangement of the subject lighting system;

FIG. 6 is an elevational view of a preferred mirror used in the lighting system shown in FIG. 5;

FIG. 7 is an end view of the mirror of FIG. 6 taken generally along the lines 7—7 thereof; and FIG. 8 is an elevational view partly in cross-section of a modified arrangement of the new lighting system.

DETAILED DESCRIPTION OF THE PREFERRED EMBODIMENTS

Figure 1:
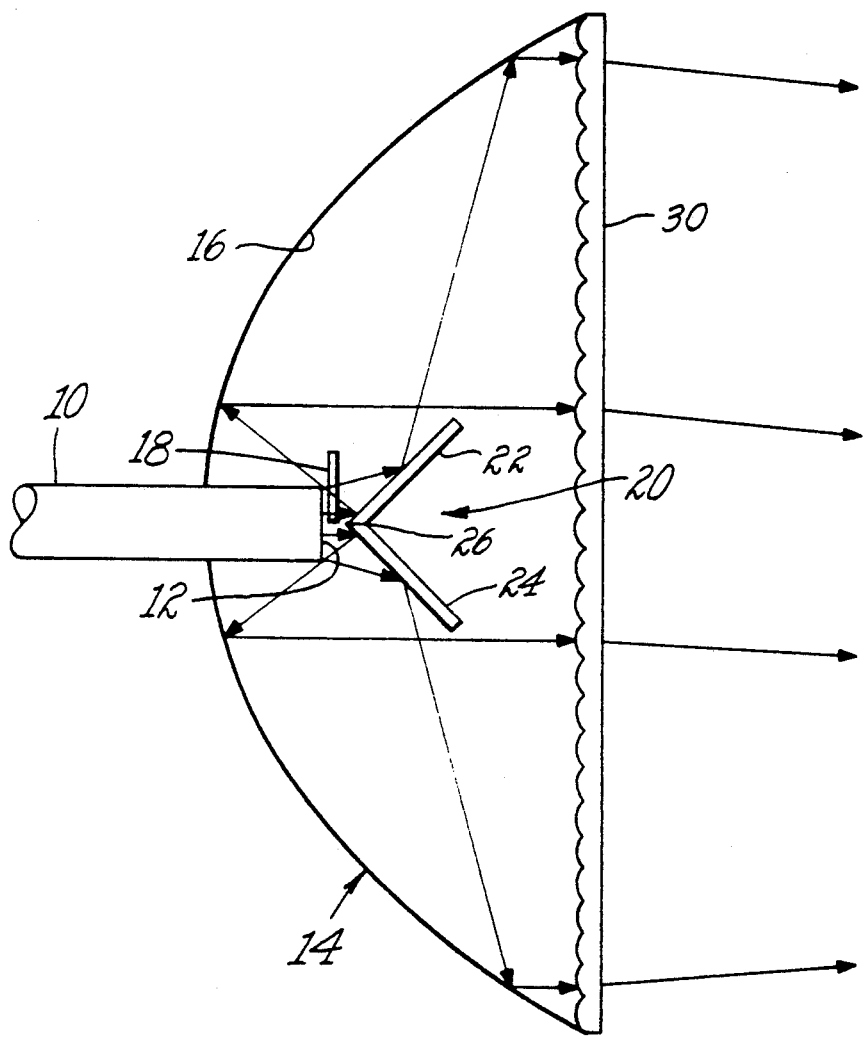
FIG. 1 is an elevational view partly in cross-section through a headlamp housing.

Referring now to the drawings wherein the showings are for purposes of illustrating preferred embodiments of the invention only and not for purposes of limiting same, FIG. 1 shows a light conductor or guide 10 that receives light from an associated source (not shown), such as a high intensity light source. Arrangements for collecting light from the source and effectively transmitting it into an input end (not shown) of one or more light guides 10 are well known in the art so that further discussion herein is deemed unnecessary.

The illustrated light guide 10 has an output end 12 disposed within a headlamp housing 14. More particularly, the housing 14 includes a rear, reflective surface 16 which, in one preferred arrangement, is a mirror or truncated mirror of a generally paraboloidal shape. Of course, other curvilinear surfaces, such as a generally spherical surface, or a compound parabolic collecting (CPC) surface could be used with equal success. The reflective surface 16 is a highly polished, mirror-like surface that receives light from the light guide output end and, through known optical principles, collimates the light.

The light guide enters the headlamp housing generally along the center line or axis of the reflective surface, and extends inwardly into the headlamp housing, terminating adjacent the focal point of the reflective surface. Of course, it will be understood that the entrance opening in the headlamp housing is appropriately sealed around the light guide.

The light exits the light guide at the output end and, by virtue of the properties of light guides, has directional properties whereby the light rays continue along the same general path as the light guide (rightwardly as shown) and only spread over a limited angular extent. This is to be contrasted with a conventional headlamp that uses an incandescent light source located at the focal point of the reflective surface where a filament thereof radiates light in all directions.

In accordance with the present invention, a mirror 20 is disposed in the path of the directional light exiting the light guide and redirects the light toward the reflective surface 16. More specifically, the mirror 20 in FIG. 1 is comprised of a pair of plane mirrors 22, 24 angularly disposed relative to one another and abutting along mating edges 26. The pair of mirrors define a generally V-shaped configuration where the vertex of the configuration, or mating edge of the mirrors, is disposed closely adjacent the output end of the light guide. As the rays exit the guide, they are reflected by the plane mirrors 22, 24 generally sidewardly and to opposite sides of the light guide, on to the reflective surface 16.

By locating the mirrors near the focus of the parabolic reflective surface, the light rays are reflected by surface 16 and also collimated. In this manner, the light rays extend forwardly (rightwardly) from the reflective surface as shown, and in the same general direction as originally propagated from the light guide.

The collimated light rays proceed outwardly away from the reflective surface 16 and through a conventional lens 30 that directs the light rays into a predetermined pattern. Depending on the desired pattern, the lens is manufactured to disperse the light in various predetermined directions and provide a directional output that satisfies the forward illumination and glare considerations of the automotive vehicle. Of course, it is understood that for an automotive application, it would be necessary to provide a means for converting between a low beam and high beam operation and vice-versa and, to this end, a mask member 18 is disposed at the output end of the light guide 10 for selectively blocking a portion of the light output.

Figure 2:
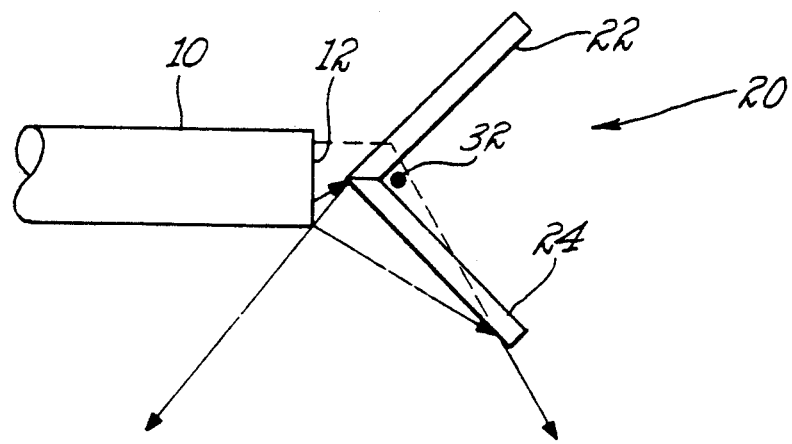
FIG. 2 is an enlarged view partly in cross-section of selected components of the lighting system of FIG. 1.

With continued reference to FIG. 1, and additional reference to FIG. 2, the details of the mirror 20 relative to the output end of the light guide are shown. Specifically, the vertex defined by the mating edges 26 of mirrors 22, 24 is spaced a preselected distance from the output end 12 of the light guide. This assures that all of the light rays exiting the guide, when reflected rearwardly by the mirror 20, miss the output end of the light guide. This maximizes the use of all light exiting from the light guide.

The focal point 32 of the reflective surface 16 is disposed closely adjacent the vertex of the pair of mirrors. Again, this assures that the light rays are essentially parallel when they are reflected from surface 16. Moreover, the mirrors 22, 24 are preferably plane mirrors since less dispersion of the light is associated with such an arrangement. That is, although one or more curvilinear mirrors could be used in accordance with the teachings of the subject invention, the planar surfaces of the mirrors maximize use of the light and further contribute to optimum brightness in the "hot spot" of the headlamp pattern.

Figure 3:
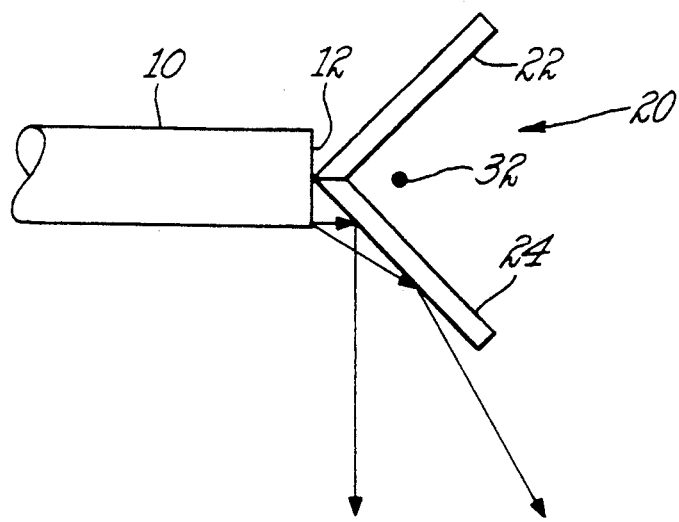
FIG. 3 is an enlarged, partial cross-sectional view of selected components of a modified version of the lighting system of FIG. 1.

The concept of using a pair of mirrors 22, 24 is also used in the modified embodiment of FIG. 3. As will be noted, though, the vertex of the pair of mirrors is located at, or more closely adjacent, the output end of the light guide. Thus, some of the rays reflected off of the planar surfaces 22, 24 are directed back into the light guide. As will be understood, some applications may desire such an arrangement for ease of assembly, even though the output of the light source is not maximized under such an arrangement. In substantially all other respects, though, the FIG. 3 embodiment is structurally and functionally the same as the embodiment of FIGS. 1-2.

As with any plane mirrors, extending the direction of the light rays to the rear side of the mirror defines a virtual image, in this case a virtual image of the light guide end. As will understood by one skilled in the art, the embodiments of FIGS. 1-3, accordingly, position the virtual images of the mirrors at a region slightly offset from the focal point of the parabolic reflective surface 16.

Figure 4:
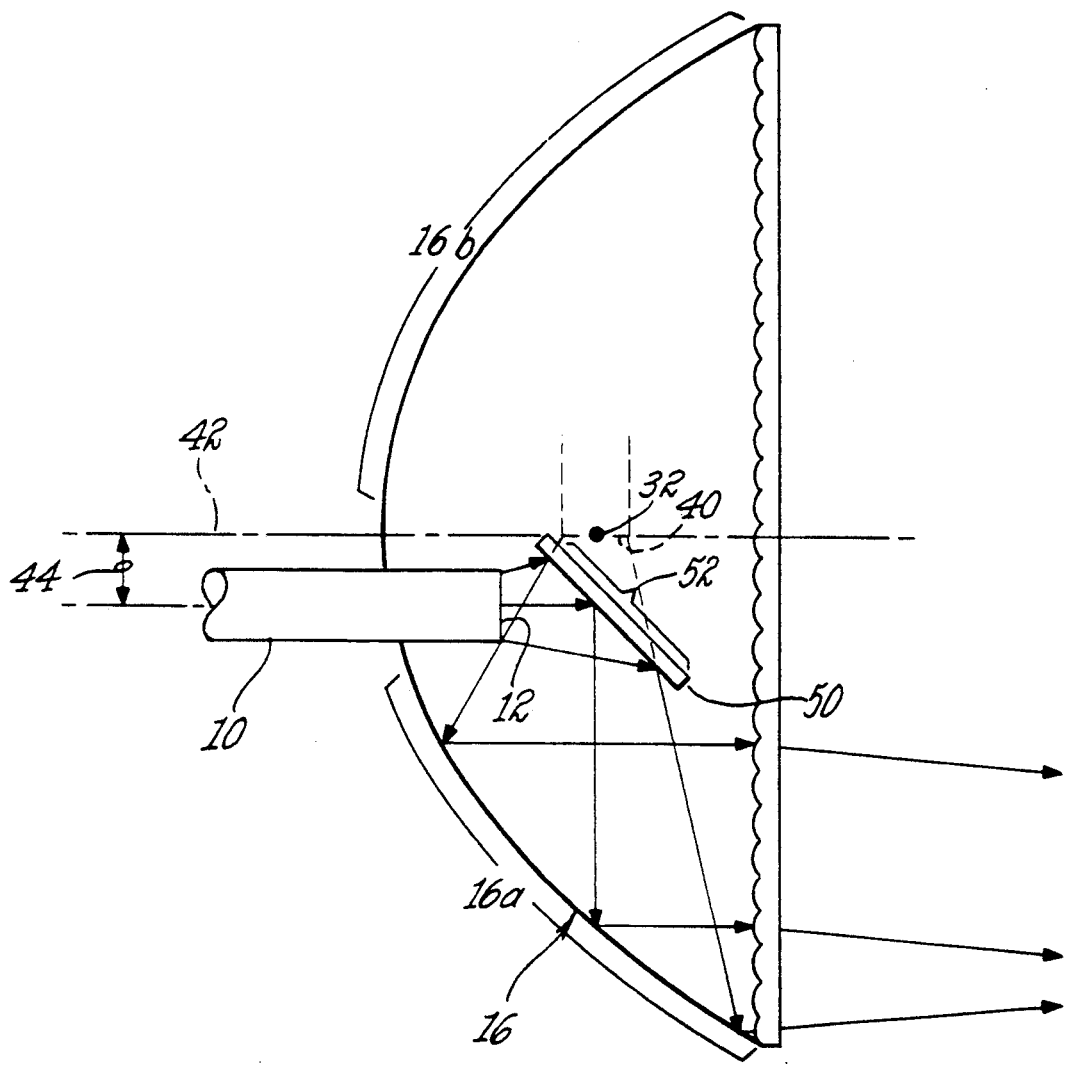
FIG. 4 is a view partially in cross-section of another preferred arrangement of the lighting system.

Accordingly, in selected situations, it may be desired to position the virtual image directly at the focal point of the parabolic surface in order to take advantage of the optical properties thereof as illustrated in the embodiment of FIG. 4. There, the virtual image 40 and the focal point 32 overlap and maximize the collimating nature of the parabolic reflective surface.

As will be readily understood by one skilled in the art, the light guide is thus offset from the center line 42 of the parabolic surface as represented by numeral 44. Further, the mirror is defined by a single plane mirror 50 positioned at an angle relative to the output end of the light guide. The mirror has a lateral dimension 52 that reflects all of the light exiting from the light guide and directs the light rays to approximately one-half 16a of the parabolic surface 16. Thus, in this embodiment, the remaining half 16b of the reflective surface is unused. Still further, the plane mirror 50 is spaced from the end of the light guide so that all of the light is reflected onto surface 16 as shown by the representative sampling of light rays. Thereafter, the rays are directed in a predetermined pattern by passing through lens 30. By such configuration the present invention has the advantage that all of the light exiting the light guide 10 strikes reflective surface 16 and is properly collimated since it gives the appearance of coming from the focal point of the parabola.

Still another embodiment is shown in FIGS. 5–7 of a lighting system used in a conventional headlamp assembly where the incandescent light source is replaced by a light guide. Again, the light guide enters generally along the center line of the parabolic reflective surface. In this arrangement, as opposed to those described above with respect to FIGS. 1-4, the parabolic reflecting surface is not truncated. Therefore, the light must be reflected over 180°.

As alluded to above, it is preferable that planar surfaces be used to reflect the light exiting the light guide onto the reflective surface 16. In this manner, the directional properties of the light as it exits the light guide are preserved, as opposed to reflecting light off of a curved mirror which would contribute to further divergence of the light rays. Therefore, the mirror 60 shown in FIGS. 5-7 includes four mutually perpendicular, triangular surfaces 62, 64, 66, 68 that meet at a point at one end and merge into a rod at the other end. The rod, for example, may be a quartz, glass, or plastic material wherein the four planar surfaces each reflect approximately one-fourth of the light received from the light guide onto the reflective surface 16.

Once again, in the preferred arrangement, the mirror 60 is located at the focus of the parabola so that the light rays are collimated when reflected from surface 16. Although not shown, it will be understood that a lens may then advantageously direct the collimated light rays into a predetermined pattern as desired.

According to still another arrangement, and with reference to FIG. 8, a light guide 10 has its output end 12 disposed generally perpendicular to the center line of the reflective surface 70. Stated in another manner, the output end of the light guide is generally perpendicular to the plane defined by the lens 30 of the headlamp. The focal point of the off axis parabolic mirror 70 is positioned to take advantage of the directional properties of the light exiting the light guide. Thus, the angular spread of the directional light from the light guide is effectively used and mates with the circumferential extent of the parabolic reflective surface 70 to collimate the light rays prior to passing through lens 30. Thus, in this arrangement, the output end of the light guide is aligned with the focal point of the parabolic mirror so that the light rays are directed from the parabolic reflective surface in a direction generally orthogonal to the axial direction of the light guide where it enters the headlamp housing.

The lens 30 has a substantially reduced cross-sectional area which finds particular application in those vehicle designs requiring small openings or decreased dimensional relationships without any corresponding loss in light output. A comparison of the effective sizes of the lenses in FIGS. 1, 5, and 8 illustrates the advantageous nature of the FIG. 8 arrangement where the light guide enters the headlamp housing from the side. More often than not, this design is not as adaptable to a retrofit arrangement, but will require a new interrelationship between the components. The inability to effectively use this embodiment in a retrofit arrangement, though, is more than offset by the advantages offered by the reduced dimensions, i.e., the compact design.

Any of the above described embodiments may simultaneously provide low beam and high beam intensities in the same headlamp system. For example, either a second light guide may be provided in the headlamp housing, and light regulated at either the input or output end, or perhaps at an intermediate point along its length, to provide additional lumens to the headlamp arrangement.

Alternatively, the above described lighting systems may continue to use a single light guide in which a portion of the output end is selectively masked. For example, a piezoelectric material will cover a portion of the output end of the light guide. Upon application of an electric field, the material will be distorted, moving the mask away from blocking the light emitted from the light guide and allowing maximum light to be directed from the headlamp. Of course other selective blocking or masking arrangements (electromagnetic, mechanical, or otherwise) may be used to selectively occlude a portion of the light exiting from the light guide to represent a low beam condition. Likewise, removing the mask from its blocking state will represent a high beam condition.

It is also contemplated that a portion of the light exiting the light guide be permitted to extend in a direction generally parallel to the axis of the reflective surface 16. This may be accomplished, for example, by leaving a gap between the plane mirrors 22, 26 in the FIGS. 1-3 embodiment. An additional lens would be required in an area spaced between the mirror 20 and the lens 30 to collimate the light extending through this gap. Moreover, the lens 30 may have to be modified to direct the non-reflected light as desired, but in all other respects the lighting system would operate as described above.

The invention has been described with reference to the preferred embodiments. Obviously, modifications and alterations will occur to others upon a reading and understanding of the specification. It is intended to include all such modifications and alterations insofar as they within the scope of the appended claims or the equivalents thereof.

What we claim as new and desire to secure by Letters Patent of the United States is:

1. A lighting system for transmitting light output from a light source to a location remote therefrom, comprising:
   an elongated optical light guide receiving light from the light source and distributing the light to an output end thereof at such remote location;
   an assembly receiving the light from the light guide output end and focusing the light in a predetermined pattern, the assembly including (i) a mirror receiving the light from the output end of the light guide and re-directing the light toward a desired location, (ii) a curved reflecting surface receiving the light from the mirror and having a focal point spaced from the output end, and (iii) a lens receiving the light from the reflecting surface and producing the predetermined pattern; and
   wherein the mirror includes first and second planar mirrored surfaces disposed at an angle relative to one another.

2. The lighting system as defined in claim 1 wherein a virtual image of the output end of the light guide produced by the mirror is substantially aligned with the focal point of the reflecting surface.

3. The lighting system as defined in claim 1 wherein the reflecting surface is a parabolic mirror that collimates the light received from the mirror, said parabolic mirror having a central axis associated therewith.

4. The lighting system as defined in claim 3 wherein the mirror and the output end of the light guide lie on the axis of the parabolic mirror.

5. The lighting system as defined in claim 1 wherein said mirror has a focal length associated therewith and the output end of the light guide is spaced from the focus of the reflecting surface a dimension equal to approximately twice the focal length of the mirror.

6. The lighting system as defined in claim 1 wherein the mirror is spaced from the output end of the light guide.

7. The lighting system as defined in claim 1 wherein the mirror is located at the output end of the light guide.

8. The lighting system as defined in claim 1 wherein the angle is approximately 270 degrees.

9. The lighting system as defined in claim 1 further comprising a mask interposed between the output end of the light guide and the lens for selectively blocking at least a portion of the light emitted from the assembly to represent a low beam condition and allowing a greater portion of the light to be emitted from the assembly to represent a high beam condition.

10. The lighting system as defined in claim 9 wherein the mask is located at the output end of the light guide.

11. A lighting system for transmitting light output from a light source to a location remote therefrom, comprising:
- at least one light guide having an input end receiving light from the light source and transmitting the light to an output end at such remote location;
- a parabolic reflector receiving the light from the output end of the light guide and reflecting the light in a direction generally parallel with an axis of the parabolic reflector;
- a reflective surface interposed between the output end of the light guide and the parabolic reflector for directing the light onto the parabolic reflector, the reflective surface forming an image of the output end of the light guide at substantially the same location as the focal point of the parabolic mirror;
- a lens for receiving the light from the parabolic reflector and directing the light in a predetermined pattern; and
- wherein the mirror includes first and second mirrors angularly disposed relative to one another for reflecting the light onto opposite halves of the parabolic reflector.

12. The lighting system as defined in claim 11 wherein the mirror is spaced from the output end of the light guide.

13. The lighting system as defined in claim 11 further comprising a mask that selectively blocks light as the light exits the light guide.

14. The lighting system as defined in claim 13 wherein the mask is formed of a piezoelectric material that mechanically deflects when an electrical field is applied thereto, allowing a greater portion of light to reach the parabolic reflector in a first condition representing a high beam and a smaller portion of light reaching the parabolic reflector in a second condition representing a low beam.

15. A lighting system for transmitting light output from a light source to a location remote therefrom, comprising:
- an elongated optical light guide receiving light from the light source and distributing the light to an output end thereof at such remote location;
- an assembly receiving the light from the light guide output end and focusing the light in a predetermined pattern, the assembly including (i) a mirror receiving the light from the output end of the light guide and re-directing the light toward a desired location, (ii) a curved reflecting surface receiving the light from the mirror and having a focal point spaced from the output end, and (iii) a lens receiving the light from the reflecting surface and producing the predetermined pattern; and
- wherein the mirror is defined by a rod end having four mutually perpendicular surfaces for dividing the light from the light source into four portions.

16. The lighting system as defined in claim 15 wherein the mirror is constructed from one of quartz, glass and plastic material.

* * * * *